United States Patent
Jarman et al.

(10) Patent No.: US 7,134,867 B2
(45) Date of Patent: Nov. 14, 2006

(54) APPARATUS FOR MOLDING A BEVERAGE CONTAINER WITH OPTIMIZED BASE

(75) Inventors: Jonathon P. Jarman, Ypsilanti, MI (US); Ivan F. Harris, Ypsilanti, MI (US)

(73) Assignee: Amcor Ltd, Victory (AU)

( * ) Notice: Subject to any disclaimer, the term of this patent is extended or adjusted under 35 U.S.C. 154(b) by 319 days.

(21) Appl. No.: 10/879,903

(22) Filed: Jun. 29, 2004

(65) Prior Publication Data

US 2005/0287242 A1 Dec. 29, 2005

(51) Int. Cl.
B29C 49/48 (2006.01)
B29C 49/62 (2006.01)

(52) U.S. Cl. ..................................... 425/525
(58) Field of Classification Search ................. 425/525
See application file for complete search history.

(56) References Cited

U.S. PATENT DOCUMENTS

| | | | |
|---|---|---|---|
| 4,378,328 A * | 3/1983 | Przytulla et al. | 264/534 |
| 4,769,206 A * | 9/1988 | Reymann et al. | 264/534 |
| 4,865,206 A | 9/1989 | Behm et al. | |
| 4,867,323 A | 9/1989 | Powers | |
| 5,024,340 A | 6/1991 | Alberghini et al. | |
| 5,205,434 A | 4/1993 | Brunson et al. | |
| 5,411,699 A * | 5/1995 | Collette et al. | 264/523 |
| 5,529,196 A | 6/1996 | Lane | |
| 5,713,480 A * | 2/1998 | Petre et al. | 215/373 |
| 6,213,325 B1 | 4/2001 | Cheng et al. | |
| 6,536,619 B1 | 3/2003 | Gaydosh et al. | |
| 6,634,517 B1 | 10/2003 | Cheng et al. | |
| 6,672,470 B1 | 1/2004 | Wurster et al. | |
| 2005/0170035 A1 * | 8/2005 | Chen | 425/525 |

* cited by examiner

Primary Examiner—Robert B. Davis
(74) Attorney, Agent, or Firm—Emch, Schaffer, Schaub & Porcello Co., L.P.A.

(57) ABSTRACT

A molding apparatus that blow molds a polymeric container having a glasslike appearance and having a shape exhibiting superior stability against toppling. The container includes a base defined by a chime and a bottom having a central push-up region. A plurality of support feet surrounds and protrudes downwardly from the bottom, each of the support feet having a substantially flat contact surface and having a radially outermost point corresponding with a vent of the apparatus at a point wherein the bottom merges with the chime.

10 Claims, 4 Drawing Sheets

APPARATUS FOR MOLDING A BEVERAGE CONTAINER WITH OPTIMIZED BASE

TECHNICAL FIELD

This invention relates to an improved mold design that allows for improved material distribution within the container base, specifically for a molded polymeric container having a shape to exhibit a glasslike profile appearance and provide superior stability against toppling.

BACKGROUND OF THE INVENTION

This invention relates generally to a one piece plastic beverage container with a footed base structure; and particularly, a container of this type molded with a reduced amount of plastic material while providing optimized material flow in the formation of each foot. These containers are usually, although not exclusively, made from a polyethylene terephthalate (PET) polyester material using a blow molding process that biaxially orients and sets the molecular structure.

A major difficulty in manufacturing such a container is controlling and minimizing the distortion of material flowing to form the footed base structure that can result from the pressure created under normal molding conditions. Such distortion can lead to poor container stability, such as that created by a "rocker bottom", where distortion in the formation of the base creates a structure such that the supporting feet cannot simultaneously contact the supporting surface. In this case, the container may be unstable and "rock" when placed on a flat surface. Thus, in the case of a footed base, it is important that one manufactures the contact lower surface of each foot properly and that surface remains properly positioned and angled. The present invention enables the consistent manufacture of such a stable footed container; a container having a substantially oval cross-sectional configuration or a substantially kidney shaped cross-sectional configuration. These cross-sectional configurations are often found in containers used by the liquor beverage industry, containers that industry often refers as a hip or pocket flask.

A continuing need exists from an improved molded plastic container and a base therefore that exhibits outstanding stability and offers the consumer the aesthetic appeal of appearing to be "glasslike" in profile. That is, the container having a profile similar to a previously made glass container. Common molding conditions and the difficulties of flowing PET materials into angularly disposed molds have dictated, until now, that the base structures of PET containers be substantially curved surfaces and therefore, such PET containers have had a decidedly non "glasslike" profile appearance. The present invention provides a PET container with a largely straight-sided base structure with subtle curved surfaces, thereby providing a container having a more "glasslike" profile appearance.

SUMMARY OF THE INVENTION

The present invention is a molded polymeric container having a shape exhibiting a glasslike profile appearance and providing a superior stability against toppling. The base of the container comprises a chime and a bottom engaged with the chime, having a central push-up region. A plurality of support feet is part of the bottom around the central push-up region and in close proximity to the chime. Each of the support feet has a bottom contact surface extending slightly lower than the outer peripheral edge of the bottom. In the preferred embodiment, outermost edge of the bottom contact surface of each of the plurality of feet integrates with the chime, and the innermost edge of the bottom contact surface of each of the plurality of feet integrates with the central push-up region.

A mold set for the manufacture of the container has generally three fundamental members; that is, two side mold members and a push-up mold member. The side mold members have a base heel-mold portion, which create the chime of the container. The push-up mold member creates the central push-up region of the container. The side mold members and push-up mold member create a split line between the members. The push-up mold member defines the outermost edge of each foot and this edge corresponds with the split line between the members. Thus, during molding trapped air exits the mold through a vent at the split line, allowing for a smooth even flow of material over the base of the container.

Those skilled in the art recognize that trapped air is a condition often typical of high-speed blow-molding container manufacturing processes of plastic materials wherein air caught between an expanding preform and surfaces of the mold compresses if that air does not have a ready vent to exit. Trapped air is not a concern in slower processes with heavier materials such as glass. As this air compresses, the air creates a momentary and often significant resistance to the expanding preform that can alter the flow of material into the mold and against these mold surfaces and in some situations halt flow thereby altering the shape of the blow-molded article. In other words, the expanding preform does not fully contact all molding surfaces; therefore, the resulting container does not replicate the mold surface.

Moreover, PET materials have a tendency to "strain harden," that is, a situation when the PET material stretched too far too quickly causes a "hardening" that effectively stops further stretching. Of course the tendency to "strain harden" also can cause the material to not replicate the mold surface.

Placing foot configurations at a far corner of the push-up mold member adjacent to the base heel-mold wherein its chime take-on a more straight, less curved character like that of a glass container taxes the technician's ability to place PET material against mold surfaces that properly replicate those far corners. Accordingly, many PET containers have a less desirable chime surface that has a more curved shape than the glass container, particularly, containers having extreme oval or kidney shaped cross-sectional configurations.

To facilitate positioning the push-up mold member of containers having oval cross-sectional configuration and having feet at the outermost edge of the push-up with adequate venting for trapped air requires use of a locking device for the push-up mold member.

Technicians often manufacture containers on rotary, cam actuated, molding machines such as on machines manufactured by Sidel, headquartered in Octeville (Le Havre), France. Those skilled in the art know these machines well.

Generally, these molding machines feature a plurality of individual mold sets positioned around a turntable having a vertical rotating axis. Each mold set features a "book" style opening and closing action, that is, one side of the mold set has a vertical hinge parallel to the vertical rotating axis of the turntable. A side of the mold set opposite the vertical hinge opens to allow removal of the molded container, placement of the container preform, and then closes to establish a mold cavity with surfaces corresponding to a container configuration. Incidentally, the preform is generally tube shaped with an open end and a closed end. In the case of the Sidel machine, the machine heats the preform before placement in the mold set to allow air at a pressure of about 600 PSI to expand the preform within the mold set. Those skilled in the art are familiar with the general shape and configuration of the preform.

Completing the mold set and the mold cavity, before the preform expands, is the push-up mold member, having a reciprocating action along an axis also parallel to the vertical rotating axis of the turntable. The push-up mold member mates with the mold side members that open and close about the vertical hinge. When in proper position, the mold side members and push-up mold member create the split line between the heel-mold portions of each mold side member. All of the actions, driven by the turntable as it rotates and as components connected to mold components having rollers engage a series of cams, facilitate mold close and open, container molding, and container removal.

Originally, Sidel intended its machine for the manufacture of containers having a substantially circular cross-sectional configuration. Accordingly, a corresponding reciprocating push-up mold member with its corresponding mold side members establishes a split line having a circular character when one views along the reciprocating axis of the push-up member. While the push-up member generally does not rotate completely about its reciprocating axis, the push-up member can swivel with a back and forth movement slightly about the reciprocating axis. The rotation of the turntable and forces applied as the various rollers engage cams as the turntable rotates, cause this slight swiveling movement of the push-up member. Of course, this slight swiveling movement is of little or no consequence with mold sets having circular split lines for the manufacture of containers having substantially circular cross-sectional configurations.

Molding technicians also use the Sidel machine to mold containers having substantially oval or kidney shaped cross-sectional configurations. However, the swivel movements of the push-up member cause wear at a point of contact along the split line between the push-up member and the side members from the side members repeatedly realigning the push-up member as the side members close around the push-up member. This split line wear, in time, cause changes to the container bottom configuration, mostly from PET material partially extruding into a vent space that is too large at one point and too small at another, that may unfavorably change container aesthetics and further cause the container to be less stable. Furthermore, while the mold side members may realign the push-up member, the vent often does not have a uniform space around the entire periphery of the split line, consequently, the venting of trapped air flows easier at certain points around the split line periphery than other points.

Traditionally, molding technicians did not address the swivel motion of the push-up mold member. Instead, technicians moved the split line well within the central push-up region and away from the bottom and chime, thereby minimizing the impact of any unwanted split line wear and corresponding changes in bottom configuration. Accordingly, these technicians, for added stability against toppling, configured any support feet needed within the side mold members. However, having the split line well within the central push-up region also moves the vent for trapped air to an undesirable, less effective position. Consequently, molding technicians have difficulty flowing material into the base-mold portion to adequately mold the container chime. To make the chime easier to mold, traditionally molding technicians altered chime shape to have a more curved and tapered configuration thus a configuration significantly different from the glasslike appearance the industry and consumer desires.

Positioning mold cavity surfaces for molding the support feet within the push-up mold member at the outermost edge of the push-up mold member facilitates a number of objectives. The feet are widely spaced to provide enhanced stability. Venting along the split line between the base heel and push-up enhances material flow with ideal vent placement, thereby, minimizing trapped air formation during the molding process. The chime has a straighter, less curved profile, thus giving the containers a more glasslike profile appearance. Finally, to minimize split line wear and to maintain uniform vent space the inventors incorporate a means to precisely align and maintain position of the push-up mold member relative to the side mold members. The invention is a molding apparatus for blow molding a polymeric container having a neck finish defining an opening, a shoulder integrally molded to the neck finish, a sidewall integrally molded to the shoulder, and a base integrally molded to the sidewall in opposition to the shoulder, the base including a chime and a bottom, the chime being generally vertically disposed with a slight inward curve at the location it joins with the bottom. The invention comprises: a pair of side mold members having a surface for molding the chime configuration; a push-up mold member having a surface for molding the bottom configuration; said push-up mold member having a center axis of reciprocation; means to prevent the push-up mold member from rotating about its center axis of reciprocation; at least one vent coincident with a split line between the pair of side mold members and the push-up mold member, said split line having a circumference, said vent having a gap between 0.010 inch and 0.020 inch and allowing trapped air to escape during a molding process; a plurality of foot surfaces disposed at an outer perimeter of the surface for molding the bottom, said outer perimeter adjacent to the vent at a location where the surface for molding the bottom joins with the surface for molding the chime and wherein the vent is disposed between the surface for molding the bottom and the surface for molding the chime; and wherein the foot surfaces extend an incremental distance no more than 0.030 inch from the surface molding the chime where it joins with the surface molding the bottom.

The footed container blow-molded with this invention is aesthetically pleasing and provides a stable wide stance, offering a glasslike profile appearance, meeting generally accepted industrial and consumer expectations.

In the preferred embodiment, the container is a blow-molded container for liquor beverages. The invention is especially suited for a container that is a flask. However, the invention is useful for blow-molded containers of all shapes.

These and other advantages of the invention will become apparent to those skilled in the art from the following description, taken in connection with the accompanying drawings.

DETAILED DESCRIPTION OF THE PREFERRED EMBODIMENT

Figure 2:
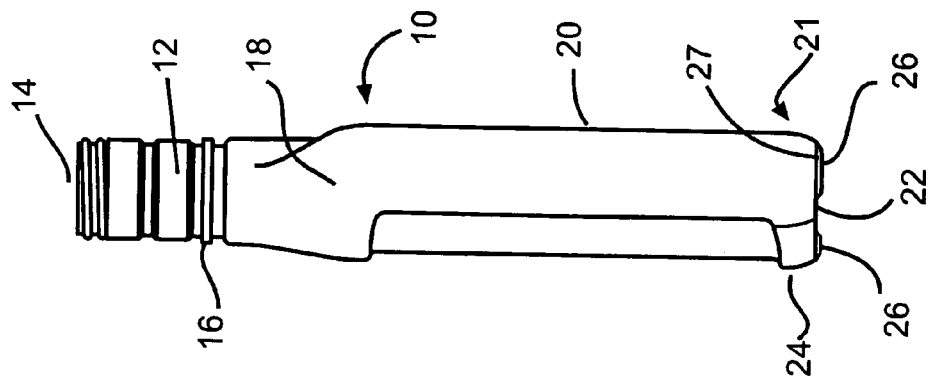
FIG. 2 is a side elevational view of the container in FIG. 1.
Figure 1A:
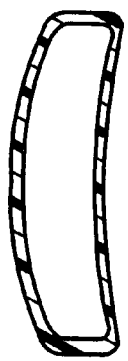
FIG. 1A is a cross-sectional view of the container in FIG. 1
Figure 1:
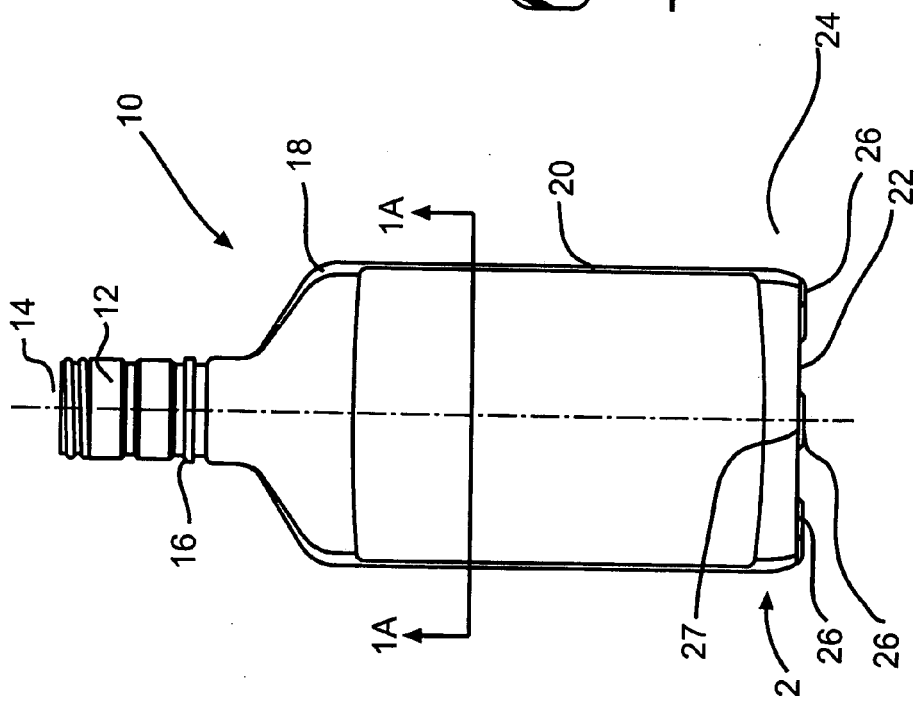
FIG. 1 is a front elevational view of a container.

FIG. 1 is a front elevational view and FIG. 2 is a side elevational view of a container 10 constructed according to this invention. While the container 10 shown is the preferred embodiment of a flask having a surface and configuration giving the container 10 a generally kidney cross-sectional shape (FIG. 1A), the inventors anticipate that one may apply this invention to blow molded containers of all shapes and sizes, in particular, containers having a generally oval, square, or rectangular cross-sectional configuration. Container 10 has a neck finish 12 defining an open-end 14, flange 16, shoulder 18, sidewall 20 and, base 21, which includes a bottom 22 and chime 24 all of which combine to define the exterior surface of the container 10. The bottom 22 includes a plurality of feet 26, preferably three, disposed proximate the chime 24, to provide stable support for the container 10. These feet 26 project a small distance beyond the bottom 22, substantially in a proportional relationship as shown in FIG. 1 and FIG. 2. For many blow-molded containers 10 applications, each foot 26 will preferably extend beyond the bottom 22 where it joins with the chime 24 approximately 0.015 to 0.030 inch. In this way, feet 26 remain a subtle feature that creates stability without the feet 26 becoming a dominant feature. However, greater distances, perhaps as much as 0.060 to 0.090 inch or more are feasible. Moreover, to give the chime 24 a consistent curvature and appearance, feet 26 preferably will not blend with the chime 24. Instead, feet 26 appear as a distinct departure from the joined contours of the bottom 22 and the chime 24. Said differently, feet 26 will appear as if one attached thin pads to the bottom 22 as an afterthought. Accordingly, each foot 26 will preferably have a defining line 27 that appears to be a continuation of bottom 22

Figure 3:
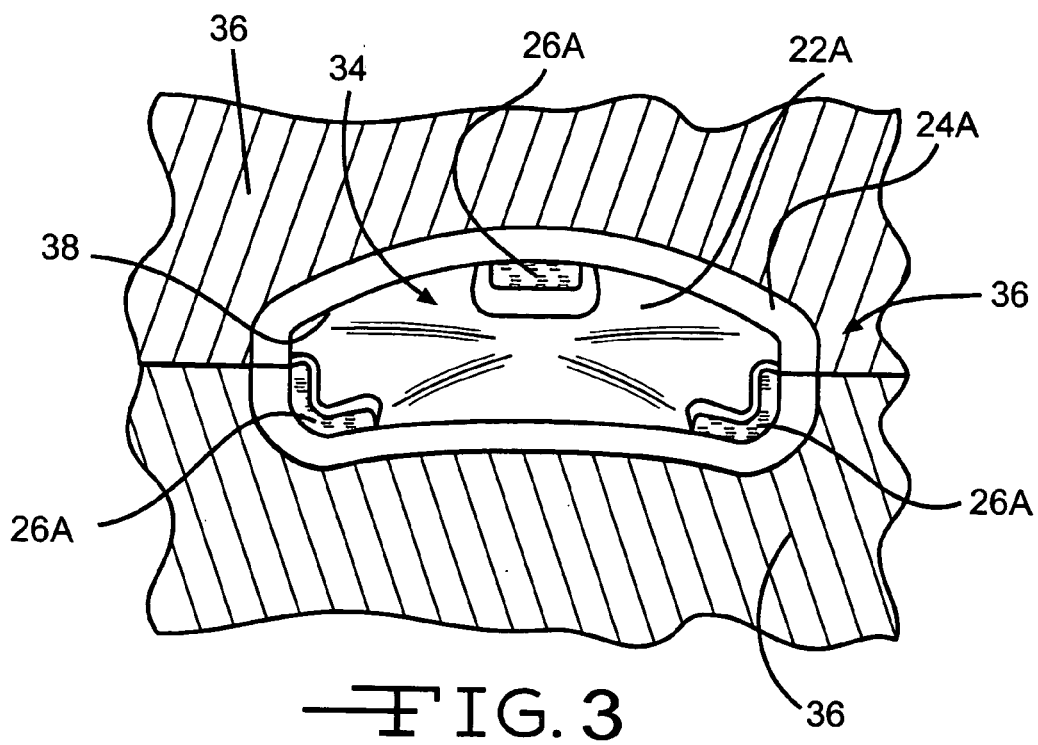
FIG. 3 is a partial top view of a push-up mold member and cross-sectional view of side mold members for the container of FIGS. 1 and 2.
Figure 5:
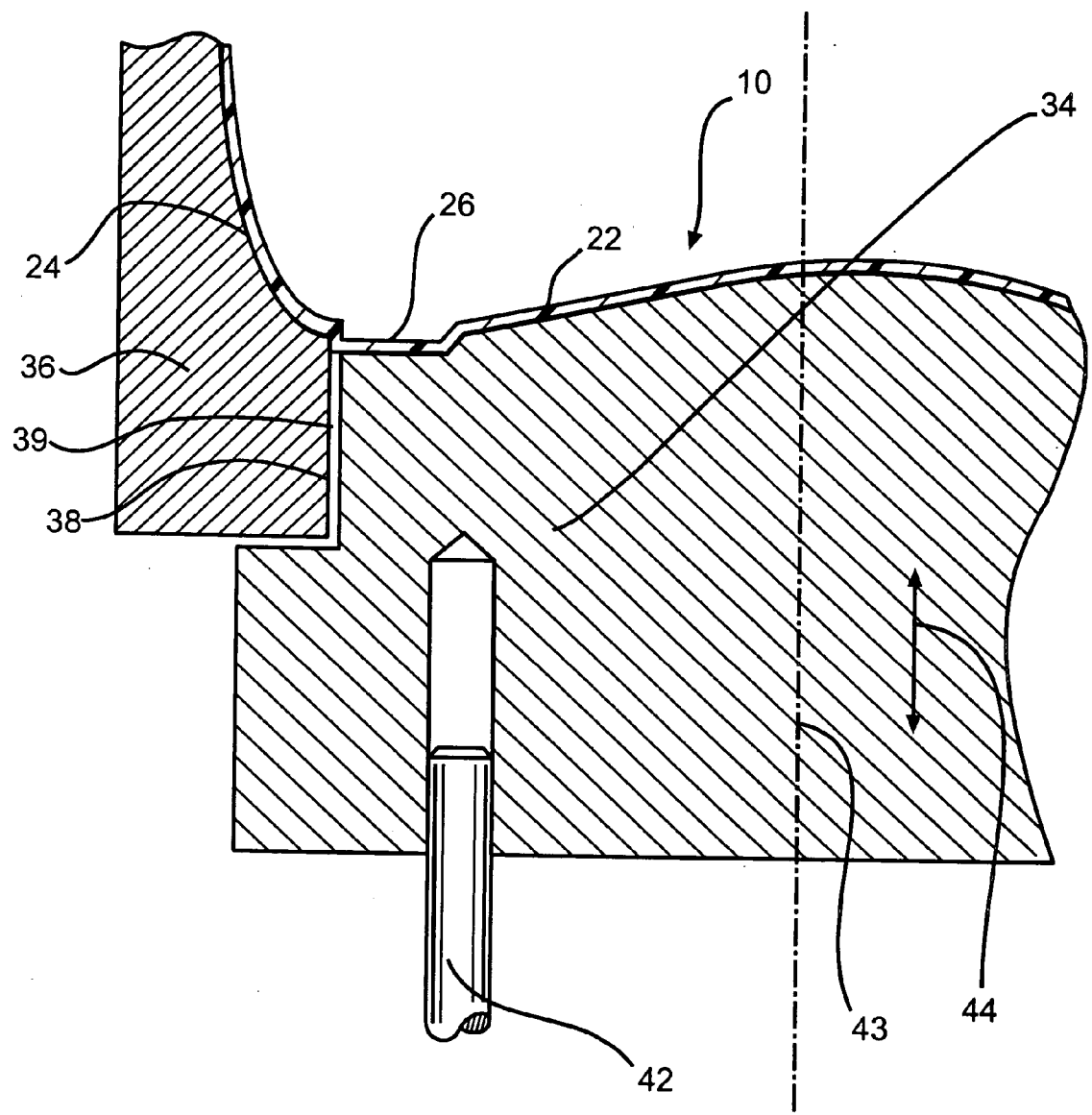
FIG. 5 is an enlarged partial cross-sectional view depicting a split line and vent between one side mold member and the push-up mold member and a partial cross-sectional view of a chime and a foot of the container of FIG. 1 as molded by the side mold member and push-up member.

FIG. 3 depicts a push-up mold member 34, showing a bottom surface 22A that shapes the container bottom 22 during the blow molding process. FIG. 3 further depicts foot surfaces 26A that shape the feet 26 positioned at an outermost edge of the bottom surface 22A. Side mold members 36 surrounds and engages the push-up mold member 34, encasing the bottom surface 22A and feet surfaces 26A. As best shown in FIG. 5, interior surface 24A of the side mold members 36 shape the chime 24. A split line 38 separates the side mold members 36 and the push-up mold member 34.

Figure 4:
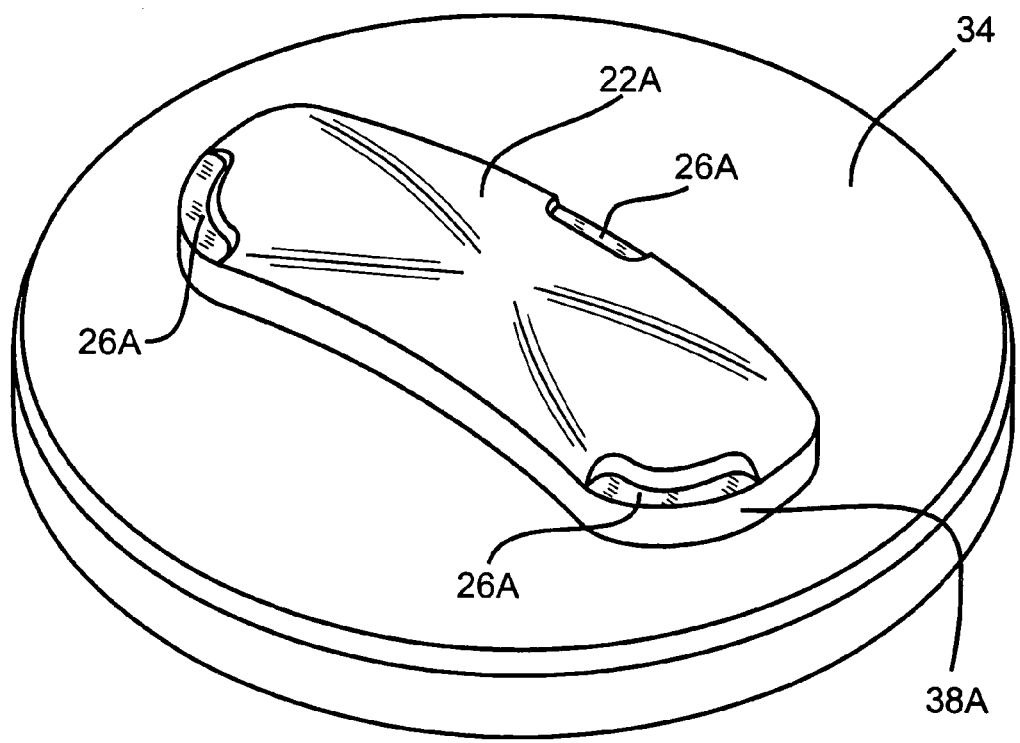
FIG. 4 is a perspective view of the push-up mold member of FIG. 3.

FIG. 4 depicts the push-up mold member 34 and the bottom surface 22A without side mold members 36. Surface 38A is a component of split line 38 and corresponds to the outermost edge of the bottom surface 22A. FIG. 4 further depicts position of foot surfaces 26A relative to the surface 38A (and coincidently split line 38) thereby showing foot surfaces 26A end at the outermost edge of the bottom surface 24A, that is, foot surfaces 26A are positioned along an outside perimeter of the push-up mold member 34. The side mold members 36 and the push-up mold member 34, when in proper position relative to each other, define a cavity (not illustrated) with surfaces substantially corresponding to the surfaces of the container 10.

FIG. 5 is a partial cross-sectional view of one side mold member 36 and the push-up mold member 34 depicting split line 38 with vent space 39. In addition, FIG. 5 depicts a partial cross-sectional view of container 10 as mold members 34, 36 creates it. Shown are the chime 24 of container 10, formed by side mold member 36 and one of the feet 26 and bottom 22, formed by the push-up mold member 34. In FIG. 5, the blow molding process has properly formed foot 26.

Figure 5A:
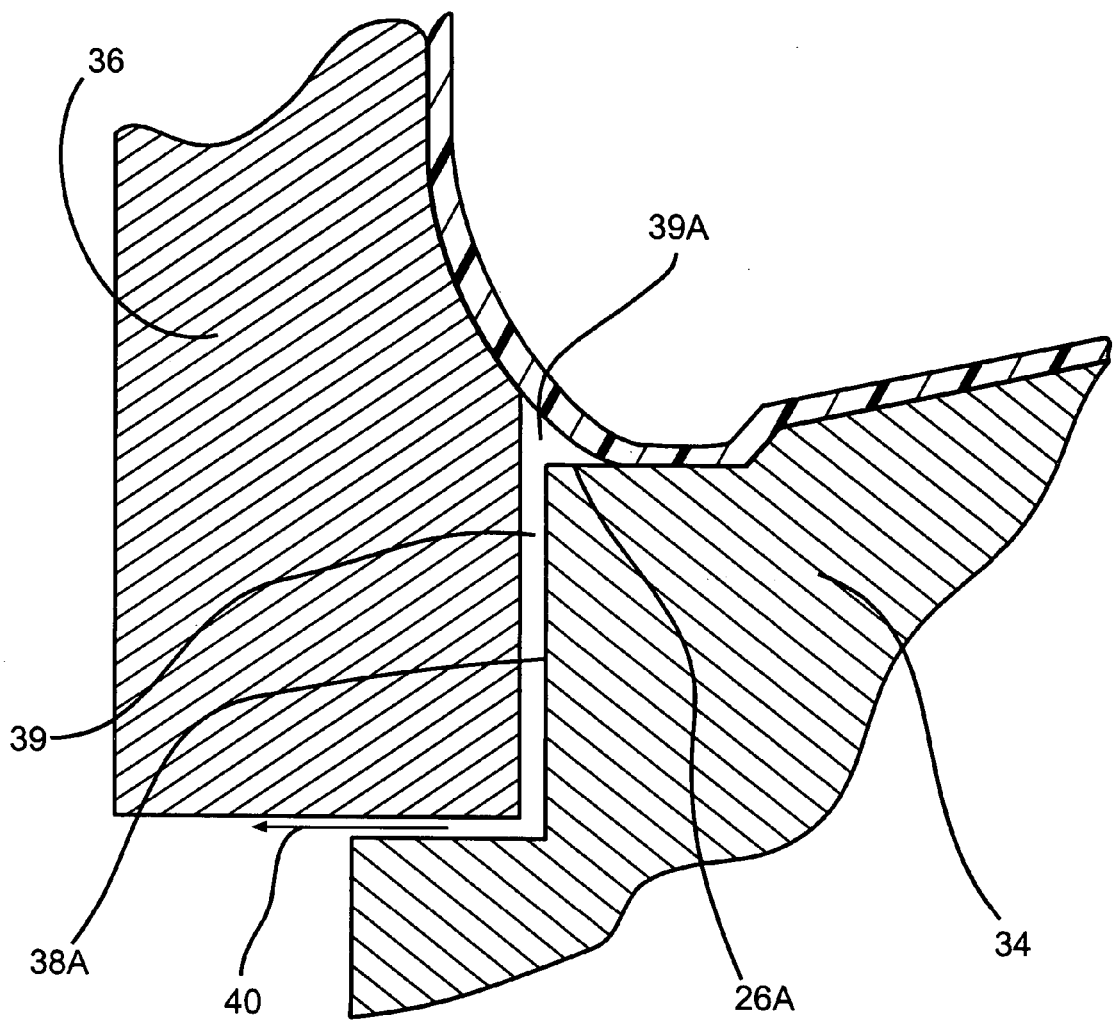
FIG. 5A similar to FIG. 5 showing a partial cross-sectional view of the container of FIG. 1 during a blow molding process a split second before the foot forms completely.

FIG. 5A illustrates container 10 a split second in time before the blow molding process properly forms foot 26 of container 10. In that split second a temporary vent space 39A forms to direct escaping trapped air 40 toward and along vent space 39. Consequently, vent space 39 of split line 38 aid material flowing into a complex mold structure created by the side mold member 36 and the push-up mold member 34 allowing trapped air to escape 40 (FIG. 5A) through the vent space 39.

By assigning the foot structure 26A to the outside perimeter of the push-up mold 34, positions vent 39 to readily allow trapped air to escape 40 thereby allowing material to flow and properly form the foot 26 of container 10. In other words, side mold members, push-up mold member, configuration of foot surfaces 26A, location of vent space 39 relative to foot surfaces 26A all cooperate to allow trapped air to escape 40.

Means 42 for maintaining generally uniform vent space 39 can be any appropriate apparatus well known in the art that precisely aligns and maintains position of the push-up mold member 34 relative to the side mold members 36 as push-up mold member reciprocates in direction 44 during the blow molding process thereby preventing push-up mold member 34 from rotating about its center axis of reciprocation 43. Accordingly, means 42 establishes generally uniform space of vent space 39 having a gap of about 0.010 to 0.020 inch, preferably about 0.015 inch, around the split line 38 that further allows trapped air to escape consistently. Moreover, means 42 minimizes damage to side mold members 36 and push-up mold member 34 that would otherwise occur from repeated realignment of the push-up mold member 34 by side mold members 36. Vent space 39 preferably is substantially continuous for the entire circumference of split line 38; however, those skilled in the art will recognize that vent space 39 may be discontinuous with a plurality of gaps strategically located at positions requiring enhance venting capability.

In summary, vent space 39, positioned on the periphery of foot surfaces 26A helps to assure that feet 26 form properly and completely during the blow molding process, thereby helping to assure that container 10 is stable. Moreover, feet 26 that have a lesser risk of incomplete formation allows technicians to give chime 24 a more vertical orientation, thus presenting a more glasslike appearance for the container.

The above detailed description of the present invention is explanatory. It will be apparent that those skilled in the art can make numerous changes and modifications without departing from the scope of the invention. Accordingly, one should construe the whole of the foregoing description in an illustrative and not a limitative sense, the scope of the invention defined solely by the appended claims.

We claim:

1. A molding apparatus for blow molding a polymeric container having a neck finish defining an opening, a shoulder integrally molded to the neck finish, a sidewall integrally molded to the shoulder, and a base integrally molded to the sidewall in opposition to the shoulder, the base including a chime and a bottom, the chime being generally vertically disposed with a slight inward curve at the location it joins with the bottom, wherein the invention comprises:
   a pair of side mold members having a surface for molding the chime configuration;
   a push-up mold member having a surface for molding the bottom configuration;
   at least one vent coincident with a split line between the pair of side mold members and the push-up mold member, said split line having a circumference, said vent allowing trapped air to escape during a molding process;
   a plurality of foot surfaces disposed at an outer perimeter of the surface for molding the bottom, said outer perimeter adjacent to the vent at a location where the surface for molding the bottom joins with the surface for molding the chime and wherein the vent is disposed between the surface for molding the bottom and the surface for molding the chime; and
   wherein the foot surfaces extend an incremental distance from the surface molding the chime and the surface molding the bottom such that the chime of the molded container presents a glasslike profile appearance.

2. The molding apparatus of claim 1, wherein the foot surfaces extend no more than 0.030 of an inch beyond the surface for molding the chime where it joins with the surface for molding the bottom.

3. The molding apparatus of claim 1, wherein the push-up mold member has a center axis of reciprocation and means to prevent said push-up mold member from rotating about its center axis of reciprocation.

4. The molding apparatus of claim 1, wherein the vent has a gap that is between 0.010 inch and 0.020 inch.

5. The molding apparatus of claim 4, wherein the vent is continuous along the split line circumference.

6. The molding apparatus of claim 1, wherein the pair of side mold members and the push-up mold member define a cavity for molding a container having one of generally oval, kidney, rectangular, and square cross-sectional configuration.

7. A molding apparatus for blow molding a polymeric container having a neck finish defining an opening, a shoulder integrally molded to the neck finish, a sidewall integrally molded to the shoulder, and a base integrally molded to the sidewall in opposition to the shoulder, the base including a chime and a bottom, the chime being generally vertically disposed with a slight inward curve at the location it joins with the bottom, wherein the invention comprises:
   a pair of side mold members having a surface for molding the chime configuration;
   a push-up mold member having a surface for molding the bottom configuration; said push-up mold member having a center axis of reciprocation;
   means to prevent the push-up mold member from rotating about its center axis of reciprocation;
   at least one vent coincident with a split line between the pair of side mold members and the push-up mold member, said split line having a circumference, said vent having a gap between 0.010 inch and 0.020 inch and allowing trapped air to escape during a molding process;
   a plurality of foot surfaces disposed at an outer perimeter of the surface for molding the bottom, said outer perimeter adjacent to the vent at a location where the surface for molding the bottom joins with the surface for molding the chime and wherein the vent is disposed between the surface for molding the bottom and the surface for molding the chime; and
   wherein the foot surfaces extend an incremental distance from the surface molding the chime and the surface molding the bottom such that the chime of the molded container presents a glasslike profile appearance.

8. The molding apparatus of claim 7, wherein the vent is continuous along the split line circumference.

9. A molding apparatus for blow molding a polymeric container having a neck finish defining an opening, a shoulder integrally molded to the neck finish, a sidewall integrally molded to the shoulder, and a base integrally molded to the sidewall in opposition to the shoulder, the base including a chime and a bottom, the chime being generally vertically disposed with a slight inward curve at the location it joins with the bottom, wherein the invention comprises:
   a pair of side mold members having a surface for molding the chime configuration;
   a push-up mold member having a surface for molding the bottom configuration; said push-up mold member having a center axis of reciprocation;
   means to prevent the push-up mold member from rotating about its center axis of reciprocation;
   at least one vent coincident with a split line between the pair of side mold members and the push-up mold member, said split line having a circumference, said vent having a gap between 0.010 inch and 0.020 inch and allowing trapped air to escape during a molding process;
   a plurality of foot surfaces disposed at an outer perimeter of the surface for molding the bottom, said outer perimeter adjacent to the vent at a location where the surface for molding the bottom joins with the surface for molding the chime and wherein the vent is disposed between the surface for molding the bottom and the surface for molding the chime; and
   wherein the foot surfaces extend an incremental distance no more than 0.030 inch from the surface molding the chime where it joins with the surface molding the bottom such that the chime of the molded container presents a glasslike profile appearance.

10. The molding apparatus of claim 9, wherein the vent is continuous along the split line circumference.

* * * * *